(12) United States Patent
Qiu et al.

(10) Patent No.: US 11,325,597 B2
(45) Date of Patent: May 10, 2022

(54) CALIBRATION DEVICE FOR LANE KEEPING ASSIST SYSTEM

(71) Applicant: AUTEL INTELLIGENT TECHNOLOGY CORP., LTD., Guangdong (CN)

(72) Inventors: Longxue Qiu, Guangdong (CN); Xinguang Tang, Guangdong (CN); Jin Chen, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 282 days.

(21) Appl. No.: 16/852,988

(22) Filed: Apr. 20, 2020

(65) Prior Publication Data

US 2020/0361459 A1 Nov. 19, 2020

Related U.S. Application Data

(63) Continuation of application No. PCT/CN2018/110083, filed on Oct. 12, 2018.

(30) Foreign Application Priority Data

Oct. 20, 2017 (CN) .......................... 201710986484.5

(51) Int. Cl.
*H01S 3/00* (2006.01)
*B60W 30/12* (2020.01)
(Continued)

(52) U.S. Cl.
CPC ........... *B60W 30/12* (2013.01); *G05D 1/0891* (2013.01); *G06V 20/588* (2022.01); *B60W 2420/62* (2013.01); *G05D 2201/0213* (2013.01)

(58) Field of Classification Search
CPC .. B60W 30/12; B60W 2420/62; B60W 10/00; B60W 50/02; B60W 50/0225;
(Continued)

(56) References Cited

U.S. PATENT DOCUMENTS 9,279,670 B2 * 3/2016 Schommer ............. G01B 11/27
10,350,998 B2 * 7/2019 Lee .................... B60K 31/0008
(Continued)

FOREIGN PATENT DOCUMENTS

CN 106405526 C 2/2017
CN 107449461 A 12/2017
(Continued)

*Primary Examiner* — Gims S Philippe (57) ABSTRACT

The present invention relates to the technical field of automobile maintenance and discloses a calibration device for a lane keeping assist (LKA) system. The calibration device includes a support apparatus, a laser and a pattern board. The support apparatus includes a horizontal graduated scale. The laser is configured to be mounted on the body of an automobile and to emit a laser beam to the horizontal graduated scale. The pattern board is mounted on the support apparatus and is configured to attach an alignment pattern. By means of the calibration device, two lasers are mounted on wheels on two sides of the automobile. Two laser beams that are emitted from equal distances with the wheels being reference points are irradiated to the horizontal graduated scale. Based on marks on the horizontal graduated scale, the support apparatus may be moved to an appropriate position to calibrate the centerline of the automobile.

20 Claims, 7 Drawing Sheets

(51) Int. Cl.
*G05D 1/08* (2006.01)
*G06V 20/56* (2022.01)

(58) Field of Classification Search
CPC ......... G05D 1/0891; G05D 2201/0213; G06V 20/588; G01S 7/4972
See application file for complete search history.

(56) References Cited

U.S. PATENT DOCUMENTS

2016/0207461 A1* 7/2016 Kal .................. H04N 7/183
2017/0166206 A1* 6/2017 Lim .................. G06V 20/588
2021/0197841 A1* 7/2021 Barcin .................. G06T 7/70

FOREIGN PATENT DOCUMENTS

| CN | 107678004 A | 2/2018 |
| CN | 107856649 A | 3/2018 |
| CN | 207631229 U | 7/2018 |

* cited by examiner

CALIBRATION DEVICE FOR LANE KEEPING ASSIST SYSTEM

CROSS-REFERENCE TO RELATED APPLICATION

This application is a continuation of International Patent Application No. PCT/CN2018/110083 filed on Oct. 12, 2018, which claims priority to Chinese Patent Application No. 201721365738.3 filed on Oct. 20, 2017, both of which are incorporated by reference herein in their entireties.

BACKGROUND

Technical Field

The present application relates to the technical fields of automobile maintenance and device calibration, and in particular, to a calibration device for a lane keeping assist (LKA) system.

Related Art

An LKA system is one of the advanced driver assist functions and mainly uses a sensor such as a vehicle-mounted camera to collect and analyze vehicle driving information (for example, a lane marking) in real time. When determining that a vehicle is about to leave a current lane, the LKA system performs intelligent control to keep the vehicle in the current lane, to assist a driver in driving the vehicle on a highway or in other monotonous road conditions, thereby reducing driving fatigue of the driver and improving driving safety of the vehicle. Different automobile manufacturers use different names for an LKA system. For example, some manufacturers call this function a lane departure warning system (LDWS).

An LKA system uses a series of vehicle-mounted sensors to obtain vehicle driving status information. Such sensors need to be mounted at appropriate angles and positions. However, during the use of a vehicle, the physical mounting states of the sensors may change due to vibration, collision, environmental temperature and humidity, and the like. Therefore, the function requires occasional alignment and calibration. Currently, in an alignment method for an LKA system used for various series of vehicles, a pattern board is placed in front of a vehicle to perform corresponding correction and sensor adjustment by using software. However, different patterns are adopted because different algorithms are used. At present, there is no universal calibration device for an LKA system.

SUMMARY

To resolve the foregoing technical problem, embodiments of the present invention provide a calibration device for an LKA system applicable to different models of automobiles.

The technical problems in the embodiments of the present invention are resolved by adopting the following technical solution:

A calibration device for an LKA system includes a support apparatus, a laser and a pattern board. The support apparatus includes a horizontal graduated scale. The laser is configured to be mounted on the body of an automobile and to emit a laser beam to the horizontal graduated scale. The pattern board is mounted on the support apparatus and is configured to attach an alignment pattern.

Optionally, the support apparatus includes a guide rail, the horizontal graduated scale being disposed on the guide rail. The horizontal graduated scale separately extends towards two sides of the guide rail with the center of the guide rail being the origin.

Optionally, the calibration device includes a reflector and a diaphragm. The support apparatus includes a sliding member. The sliding member is movably mounted on the guide rail and is slidable along the guide rail. The horizontal graduated scale is configured to facilitate positioning of the sliding member. The reflector is mounted on the sliding member and is slidable together with the sliding member along the guide rail. The diaphragm is configured to control the laser beam to pass through the diaphragm. The reflector is configured to reflect the laser beam that passes through the diaphragm to the laser.

Optionally, the diaphragm is provided with a strip-shaped diaphragm slot, configured to control the laser beam to pass through the diaphragm.

Optionally, the diaphragm includes a fixing base and a sliding diaphragm. The sliding diaphragm is provided with the diaphragm slot. The sliding diaphragm is mounted on the fixing base. Positions of the sliding diaphragm and the fixing base are adjustable.

Optionally, the fixing base includes a base, a fixing support and a locking handle. An end of the fixing support is mounted on the base. The fixing support has a strip shape. The locking handle is mounted on the fixing support. The sliding diaphragm includes a diaphragm portion and a sliding slot portion. The diaphragm portion has a panel shape and is provided with the diaphragm slot. The sliding slot portion is mounted on the diaphragm portion, has a strip shape and is movably sleeved in the fixing support. The sliding slot portion is provided with a strip-shaped groove. The locking handle passes through the groove and is configured to fasten the sliding diaphragm to the fixing base.

Optionally, the laser includes an emitting portion, a mounting shaft and an observation target. The emitting portion is configured to emit the laser beam. The mounting shaft is mounted on the emitting portion and is configured to mount the laser on a wheel hub of the automobile. The observation target is mounted on the emitting portion. The observation target includes an observation target surface configured to display the position of the laser beam reflected back by the reflector. An emitting hole is provided in a middle part of the observation target surface.

Optionally, the support apparatus includes a support assembly and a beam assembly. The beam assembly is mounted on the support assembly and is movable in a vertical direction relative to the support assembly. The beam assembly includes the guide rail. The guide rail is horizontally disposed.

Optionally, the support assembly includes a support body and height adjustment members. At least three height adjustment members are mounted on a bottom surface of the support body. The at least three height adjustment members are configured to adjust an overall horizontal angle of the support body and a pitch angle of the support body.

Optionally, there are three height adjustment members. The three height adjustment members are distributed in an isosceles triangle and are configured to adjust the overall horizontal angle of the support body in cooperation. The height adjustment member located at the vertex position of the vertex angle of the isosceles triangle is configured to adjust the pitch angle of the support body.

Optionally, the support assembly includes a base support and an upright support. An end of the upright support is connected to the base support. The base support supports the upright support. The beam assembly is mounted on the upright support. The base support includes caster wheels, the support body and the height adjustment members. At least three caster wheels are mounted on the bottom surface of the support body and are configured to facilitate the movement of the base support.

Optionally, the upright support includes a lifting screw rod. The lifting screw rod is disposed in a vertical direction. The beam assembly is sleeved on the lifting screw rod and fits threads of the lifting screw rod. When the lifting screw rod rotates around the central axis of the lifting screw rod, the lifting screw rod may drive the beam assembly to move in a vertical direction along the lifting screw rod.

Optionally, the upright support includes a lifting guide rail. The lifting guide rail includes a vertical bar. The vertical bar is disposed in a vertical direction. The beam assembly is movably mounted on the vertical bar. The vertical bar is configured to guide the beam assembly to move in a vertical direction.

Optionally, the lifting guide rail includes a cross bar. The cross bar is mounted on the vertical bar in a horizontal direction. One end of the lifting screw rod is mounted on the cross bar. The other end of the lifting screw rod is mounted on the support body.

Optionally, the lifting guide rail includes a cross bar and a bottom bar. Two vertical bars are disposed at an interval in parallel in a vertical direction. The cross bar is disposed in a horizontal direction, two ends of the cross bar being respectively mounted on the two vertical bars. The bottom bar is fixedly mounted on the support body. An end, away from the cross bar, of each vertical bar is fixedly mounted on the bottom bar. One end of the lifting screw rod is fixedly mounted on the cross bar and the other end of the lifting screw rod is fixedly mounted on the bottom bar.

Optionally, the upright support includes a height gauge. The height gauge is mounted on the vertical bar in a vertical direction and is configured to measure a movement distance of the beam assembly in a vertical direction.

Optionally, the beam assembly includes a supporting member and the guide rail. The supporting member includes a supporting body and a movable block. The movable block is fixedly mounted on the supporting body and is sleeved on the lifting screw rod. The movable block fits the threads of the lifting screw rod. The guide rail is fixedly mounted on the supporting body in a horizontal direction. The sliding member is movably mounted on the guide rail and is movable along the guide rail in a horizontal direction.

Optionally, the upright support includes a vertical bar. The vertical bar is disposed in a vertical direction. The supporting member includes a slider. The slider is fixedly mounted on the supporting body. The slider is movably mounted on the vertical bar and is slidable along the vertical bar.

Optionally, two opposite sides of the supporting body extend to form two clamping portions respectively. The two clamping portions have a long strip shape and are disposed at an interval in parallel to each other in a horizontal direction. Two guide rails are respectively mounted on the two clamping portions and are disposed at an interval of a preset distance in parallel in a horizontal direction. The sliding member is movably mounted on the guide rails by using a sliding bearing.

Optionally, the beam assembly includes a horizontal bead. The horizontal bead is configured to detect whether the guide rail is disposed in a horizontal direction.

Optionally, the pattern board is detachably mounted on the support apparatus. The pattern board includes an attaching board configured to attach the alignment pattern.

Optionally, the attaching board is a rectangular magnetic board, configured to attach a magnetic fabric having the alignment pattern by a magnetic attraction force.

Compared with the prior art, by means of the calibration device in the embodiments of the present invention, two lasers are mounted on wheels on two sides of the automobile, Two laser beams that are emitted from equal distances with the wheels being reference points are irradiated to the horizontal graduated scale. Based on marks on the horizontal graduated scale, the support apparatus may be moved to an appropriate position to facilitate calibration of the centerline of the automobile. If the centerline of the automobile has been calibrated, a corresponding alignment pattern may be selected or changed based on the model of the automobile and attached on the pattern board, thereby facilitating calibration operations for an LKA system for different models of automobiles.

In addition, by means of the calibration device in the embodiments of the present invention, on one side of the automobile, the reflector is moved to an irradiation region of the laser on the side of the vehicle, so that a laser point can be reflected back into an incident direction of the laser point. The diaphragm is placed at a middle position between the laser and the reflector, so that an emergent laser beam can pass through the diaphragm slot to be irradiated to the reflector. Therefore, the laser point reflected by the reflector can return to an emergent point of the laser, thereby facilitating precise calibration of the centerline of the automobile. If the centerline of the automobile has been precisely calibrated, calibration operations for an LKA system can be more accurately implemented.

BRIEF DESCRIPTION OF THE DRAWINGS

Exemplary descriptions of one or more embodiments are provided through accompanying drawings corresponding to the one or more embodiments. These exemplary descriptions do not constitute any limitation on the embodiments. Elements having identical reference numerals in the drawings represent similar elements. Unless particularly stated, figures in the accompanying drawings do not constitute any proportional limitation.

DETAILED DESCRIPTION

For ease of understanding the present invention, the present invention is described in further detail below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. The terms such as "perpendicular", "horizontal", "left", "right", "inner", "outer" and similar expressions used in this specification are merely used for the purpose of description.

Unless otherwise defined, meanings of all technical and scientific terms used in this specification are the same as those usually understood by persons skilled in the technical field to which the present invention belongs. The terms used in the specification of the present invention are merely intended to describe specific embodiments rather than limit the present invention. The term "and/or" used in this specification includes any or all combinations of one or more related listed items.

In addition, the related technical features in different embodiments of the present invention described below may be combined with each other provided that no conflict occurs therebetween.

Figure 1:
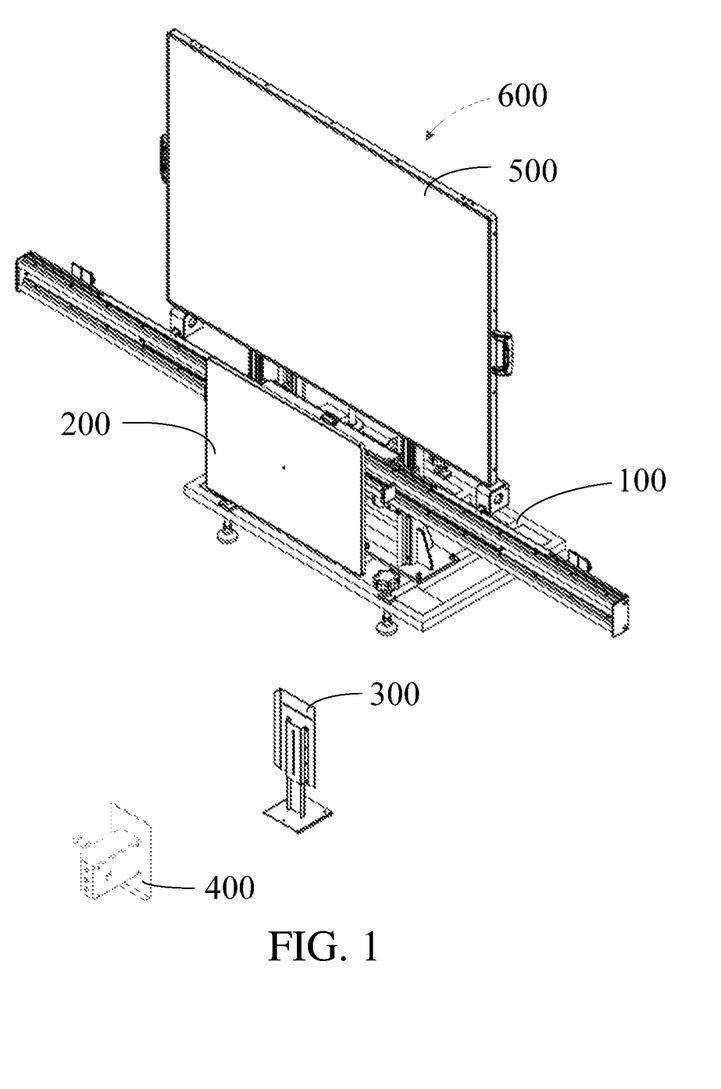
FIG. 1 is a perspective view of a calibration device for an LKA system according to an embodiment of the present invention.

Referring to FIG. 1, a calibration device 600 for an LKA system provided by an embodiment of the present invention includes a support apparatus 100, a reflector 200, a diaphragm 300, a laser 400 and a pattern board 500. The reflector 200 is mounted on the support apparatus 100. The support apparatus 100 is configured to support the reflector 200. Under an external force, the reflector 200 is movable in a horizontal direction or move in a vertical direction. The laser 400 is configured to emit a laser beam. The diaphragm 300 is configured to prevent the laser beam from passing through the diaphragm 300 or to allow the laser beam to pass through the diaphragm 300. The reflector 200 is configured to reflect the laser beam that passes through the diaphragm 300 to the laser 400. The pattern board 500 is mounted on the support apparatus 100 and is configured to attach an alignment pattern of the LKA system.

Figure 2:
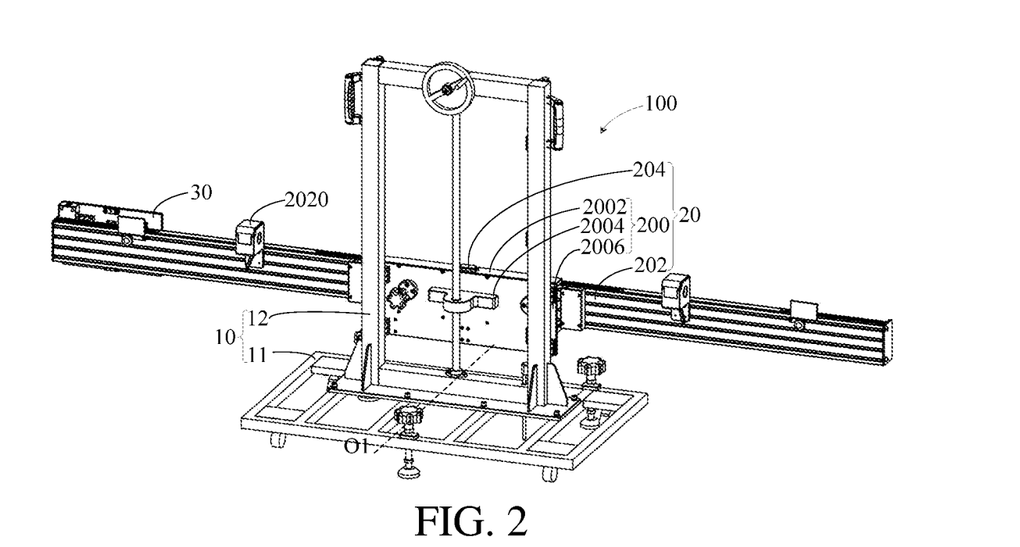
FIG. 2 is a perspective view of a support apparatus of the calibration device shown in FIG. 1.

Referring to FIG. 2, the support apparatus 100 includes a support assembly 10, a beam assembly 20 and a sliding member 30. The beam assembly 20 is mounted on the support assembly 10 and is movable in a vertical direction relative to the support assembly 10. The sliding member 30 is mounted on the beam assembly 20 and is movable in a horizontal direction relative to the beam assembly 20. The reflector 200 is mounted on the sliding member 30 and is movable with the sliding member 30 in a horizontal direction relative to the beam assembly 20.

The support assembly 10 includes a base support 11 and an upright support 12. An end of the upright support 12 is connected to the base support 11. The base support 11 supports the upright support 12.

Figure 3:
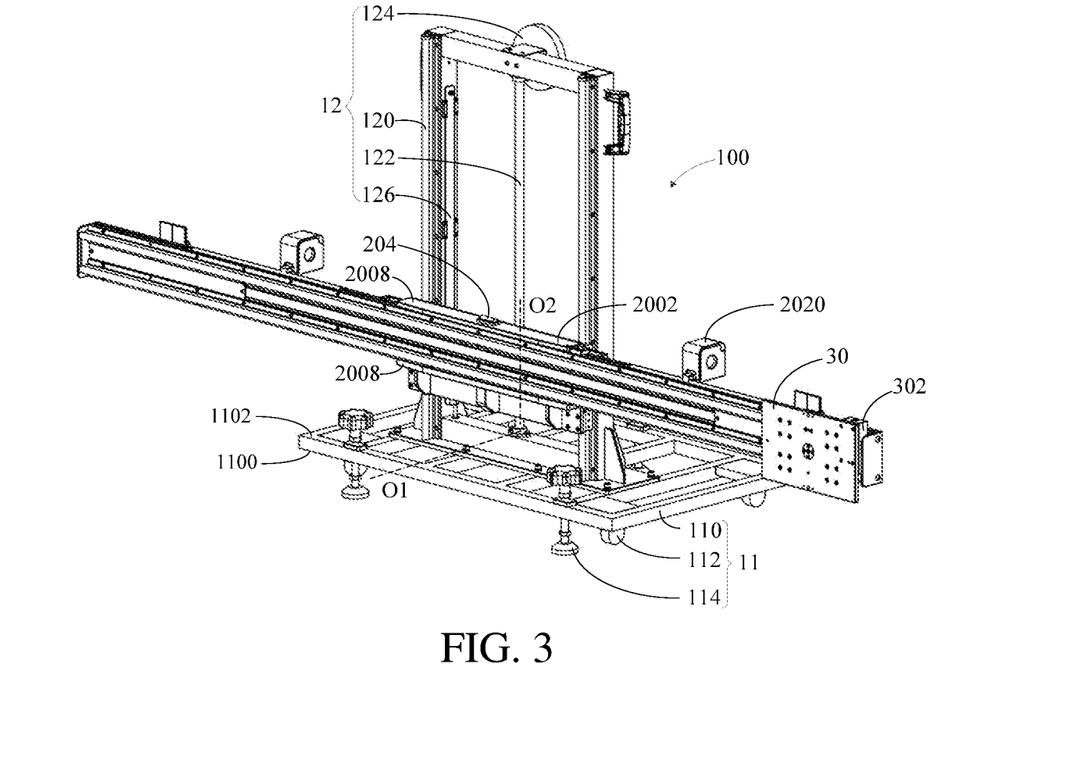
FIG. 3 is a perspective view of the support apparatus shown in FIG. 2 from another perspective.
Figure 4:
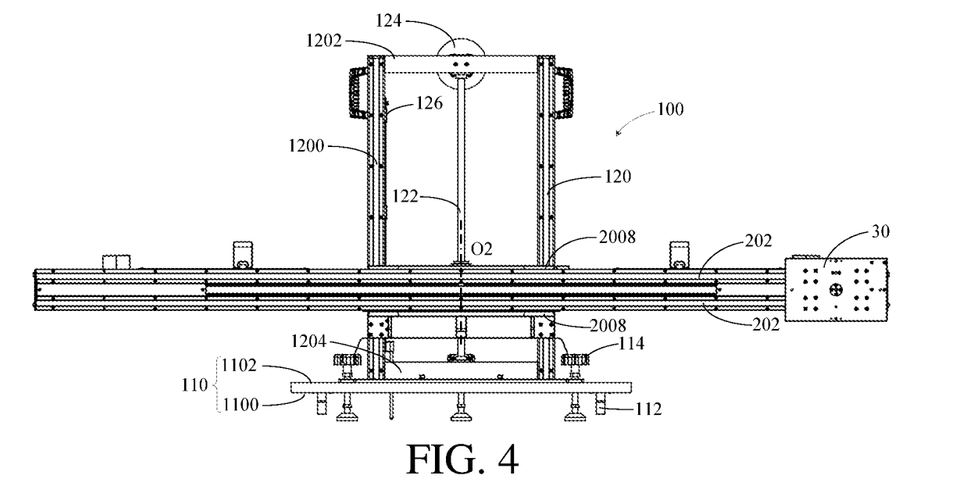
FIG. 4 is a front view of the support apparatus shown in FIG. 2.

Referring to FIG. 3 and FIG. 4, the base support 11 includes a support body 110, caster wheels 112 and height adjustment members 114. The support body 110 is a rectangular board and may be made of a metal material, A plurality of hollowed-out regions are formed to reduce the weight. The support body 110 includes a bottom surface 1100 and a top surface 1102 that are oppositely disposed. The support body 110 is provided with the central axis O1.

The caster wheels 112 are mounted on the bottom surface 1100 and are configured to facilitate the movement of the base support 11. In this embodiment, the caster wheels 112 are universal caster wheels, so that the base support 11 may freely move in any direction. There are four caster wheels 112. The four caster wheels 112 are respectively mounted at four corners of the support body 110. It can be understood that in some other embodiments, the shape of the support body 110 may be changed according to an actual requirement and is not limited to a rectangle. For example, the support body 110 may be circular. There may be more or fewer caster wheels 112 according to an actual requirement, provided that there are at least three caster wheels 112.

The height adjustment members 114 are mounted on the bottom surface 1100 and are configured to adjust the height of the support body 110. In this embodiment, the height adjustment members 114 are three adjusting hand wheels. The three adjusting hand wheels 114 are distributed in an isosceles triangle. Two adjusting hand wheels 114 located at the base of the isosceles triangle are disposed on one side of the support body 110 and are symmetrically disposed about the central axis O1 of the support body 110. The other adjusting hand wheel 114 is disposed on the other side of the support body 110 and is disposed on the central axis O1 of the support body 110 (that is, disposed at the vertex position of the vertex angle of the isosceles triangle). The three adjusting hand wheels 114 may be used in cooperation to adjust an overall horizontal angle of the support body 110. A pitch angle of the support body 110 may be adjusted by separately adjusting the adjusting hand wheel 114 located on the central axis O1 of the support body 110.

It can be understood that the height adjustment members 114 may be other apparatuses that can be used to adjust a height. There may be more height adjustment members 114 according to an actual requirement, provided that there are at least three height adjustment members 114.

The upright support 12 includes a lifting guide rail 120, a lifting screw rod 122, an elevating crank handle 124 and a height gauge 126.

The lifting guide rail 120 is mounted on the support body 110 and includes a vertical bar 1200, a cross bar 1202 and a bottom bar 1204. Two vertical bars 1200 are disposed at an interval in parallel in a vertical direction and are configured to guide the beam assembly 20 to move in a vertical direction. The cross bar 1202 is disposed in a horizontal direction, two ends of the cross bar 1202 being respectively mounted on the two vertical bars 1200. The bottom bar 1204 is fixedly mounted on the support body 110. An end, away from the cross bar 1202, of each vertical bar 1200 is fixedly mounted on the bottom bar 1204.

It can be understood that in some other embodiments, there may be more or fewer vertical bars 1200 according to an actual case. For example, there may be one or more vertical bars 1200.

The lifting screw rod 122 is fixedly mounted on the lifting guide rail 120 in a vertical direction. One end of the lifting screw rod 122 is fixedly mounted on the cross bar 1202. The other end of the lifting screw rod 122 is fixedly mounted on the bottom bar 1204.

It can be understood that in some other embodiments, the bottom bar 1204 may be omitted. The end, away from the cross bar 1202, of each vertical bar 1200 is fixedly mounted on the support body 110. The lifting screw rod 122 is fixedly mounted on the lifting guide rail 120 in a vertical direction. One end of the lifting screw rod 122 is fixedly mounted on the cross bar 1202. The other end of the lifting screw rod 122 is fixedly mounted on the support body 110.

The elevating crank handle 124 is mounted on the cross bar 1202, is connected to the lifting screw rod 122 and is configured to rotate to drive the lifting screw rod 122 to rotate around the central axis of the lifting screw rod 122. In this embodiment, a connecting bar of the elevating crank handle 124 is perpendicular to the lifting screw rod 122 and connected to the lifting screw rod 122 through a gear structure. It can be understood that in some other embodiments, the connecting bar of the elevating crank handle 124 may be coaxial with the lifting screw rod 122. The connecting bar of the elevating crank handle 124 is directly connected to the lifting screw rod 122. Alternatively, the elevating crank handle 124 may be replaced with another apparatus configured to drive the lifting screw rod 122 to rotate. For example, a motor is adopted.

The height gauge 126 is mounted on the vertical bar 1200 in a vertical direction. The height gauge 126 is provided with marks and is configured to measure a movement distance of the beam assembly 20 in a vertical direction.

Referring to FIG. 2 and FIG. 3, the beam assembly 20 includes a supporting member 200, a guide rail 202 and a horizontal bead 204. The supporting member 200 is mounted on the lifting guide rail 120. Under guidance of the lifting guide rail 120, the supporting member 200 is movable in a vertical direction relative to the lifting guide rail 120. The guide rail 202 is fixedly mounted on the supporting member 200 and is movable together with the supporting member 200 in a vertical direction relative to the lifting guide rail 120. The sliding member 30 is mounted on the guide rail 202 and is movable in a horizontal direction relative to the guide rail 202.

The supporting member 200 includes a supporting body 2002, a movable block 2004 and a slider 2006.

The supporting body 2002 has approximately a panel shape, two opposite sides of the supporting body 2002 extending to form two clamping portions 2008 respectively. The two clamping portions 2008 have a long strip shape (referring to FIG. 3 and FIG. 4) and are disposed at an interval in parallel to each other in a horizontal direction.

The movable block 2004 is fixedly mounted on the supporting body 2002 and is sleeved on the lifting screw rod 122. The movable block 2004 fits threads of the lifting screw rod 122. When rotating around the central axis of the movable block 2004, the lifting screw rod 122 may drive the movable block 2004 to move along the lifting screw rod 122 in a vertical direction, thereby driving the beam assembly 20 to move in a vertical direction. The movable block 2004 and the clamping portions 2008 are respectively located on the two opposite sides of the supporting body 2002.

The slider 2006 is fixedly mounted on the supporting body 2002 and is located on the same side of the supporting body 2002 as the movable block 2004. At least one slider 2006 is correspondingly mounted on each vertical bar 1200. Each slider 2006 is movably mounted on the vertical bar 1200 corresponding to the slider 2006 and is slidable along the vertical bar 1200 corresponding to the slider 2006. In this embodiment, two sliders 2006 are correspondingly mounted on each vertical bar 1200. It can be understood that in some other embodiments, more or fewer sliders 2006 may be correspondingly mounted on each vertical bar 1200 according to an actual requirement. For example, one slider 2006 is mounted or three sliders 2006 are mounted.

Two guide rails 202 are respectively and correspondingly mounted on the two clamping portions 2008 and are disposed at an interval of a preset distance in parallel in a horizontal direction. A horizontal graduated scale 2020 separately extends towards two sides of the guide rail 202 with the center of the guide rail 202 being the origin and is configured to facilitate positioning of the sliding member 30. The central axis O2 of the guide rail 202 and the central axis O1 of the support body 110 are located in the same plane. It can be understood that in some other embodiments, there may be more or fewer guide rails 202 according to an actual requirement. For example, there is one guide rail 202 or there are three guide rails 202. The guide rails 202 may be fixedly mounted on the supporting member 200 in any other appropriate manner. For example, the clamping portions 2008 are omitted and the guide rails 202 are directly welded to the support body 2002.

The horizontal bead 204 is mounted on an upper side of the clamping portions 2008 and is configured to detect whether the clamping portions 2008 are horizontally disposed, to determine whether the guide rails 202 are horizontally disposed. It can be understood that in some other embodiments, the horizontal bead 204 may be mounted on the guide rail 202 or may be mounted on another part of the beam assembly 20, provided that it can be detected whether the guide rails 202 are horizontally disposed.

The sliding member 30 is movably mounted on the guide rail 202 and is movable along the guide rail 202 in a horizontal direction. In this embodiment, the sliding member 30 is movably mounted on the guide rail 202 by using a sliding bearing 302. The sliding member 30 includes several mounting points, configured to mount the reflector 200. It can be understood that in some other embodiments, the sliding member 30 may be mounted on the guide rail 202 in another appropriate manner. For example, the sliding bearing 302 is omitted and the sliding member 30 is directly mounted on the guide rail 202.

Referring to FIG. 1 again, the reflector 200 is mounted on the mounting points. The reflector 200 has a rectangular panel shape, includes a reflective surface and is configured to reflect the laser beam that passes through the diaphragm 300 to the laser 400.

Figure 5:
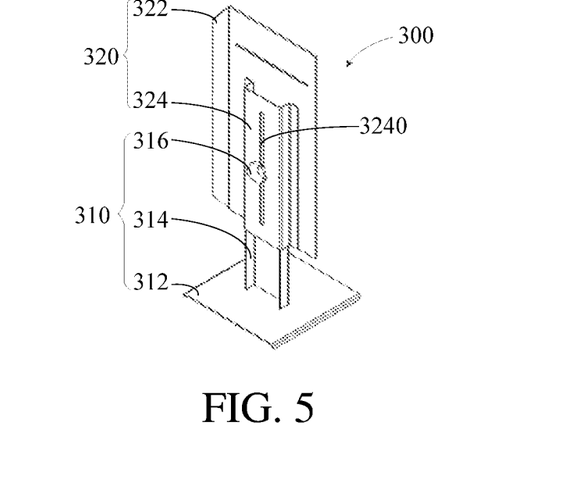
FIG. 5 is a perspective view of a diaphragm of the calibration device shown in FIG. 1.
Figure 6:
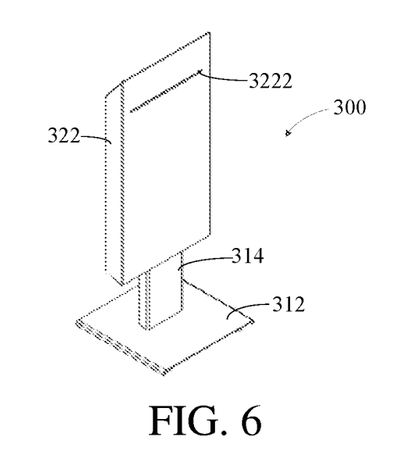
FIG. 6 is a perspective view of the diaphragm shown in FIG. 5 from another perspective.

Referring to FIG. 5 and FIG. 6, the diaphragm 300 includes a fixing base 310 and a sliding diaphragm 320.

The fixing base 310 includes a base 312, a fixing support 314 and a locking handle 316. The base 312 is a rectangular board. An end of the fixing support 314 is mounted on a middle part of the base 312. The fixing support 314 is perpendicular to the base 312. The fixing support 314 has a strip shape. The locking handle 316 is mounted on the fixing support 314.

The sliding diaphragm 320 includes a diaphragm portion 322 and a sliding slot portion 324. The diaphragm portion 322 has approximately a panel shape and is provided with a strip-shaped diaphragm slot 3222 configured to allow a laser beam to pass through. The width of the diaphragm slot 3222 is slightly less than the diameter of a laser point emitted by the laser 400, so that it is convenient to detest whether the laser beam exactly passes through the diaphragm slot 3222. The sliding slot portion 324 is mounted on the diaphragm portion 322, has a strip shape and is sleeved on the fixing support 314. The sliding slot portion 324 is slidable relative to the fixing support 314. The sliding slot portion 324 is provided with a strip-shaped groove 3240. The locking handle 316 passes through the groove 3240 and is configured to stably fasten the sliding diaphragm 320 to the fixing base 310.

Figure 7:
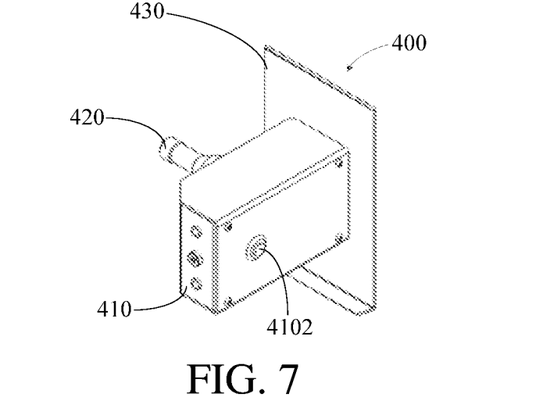
FIG. 7 is a perspective view of a laser of the calibration device shown in FIG. 1.
Figure 8:
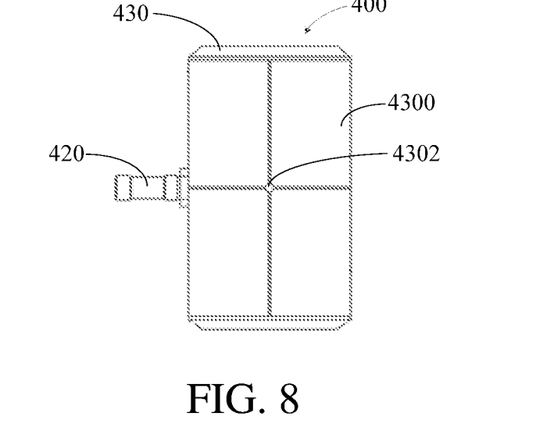
FIG. 8 is a perspective view of the laser shown in FIG. 7 from another perspective.

Referring to FIG. 7 and FIG. 8, the laser 400 is a wheel hub laser and includes an emitting portion 410, a mounting shaft 420 and an observation target 430. The emitting portion 410 is configured to emit the laser beam. The emitting portion 410 includes a switch 4102, configured to turn on or turn off the emitting portion 410. The mounting shaft 420 is mounted on the emitting portion 410 and is configured to mount the wheel hub laser 400 on a wheel hub of an automobile. The observation target 430 is mounted on the emitting portion 410. The observation target 430 is a rectangular board and includes an observation target surface 4300 configured to display the position of the laser reflected back by the reflector 200. An emitting hole 4302 is provided in a middle part of the observation target surface 4300 and is configured to allow the laser beam to be emitted outside.

Figure 9:
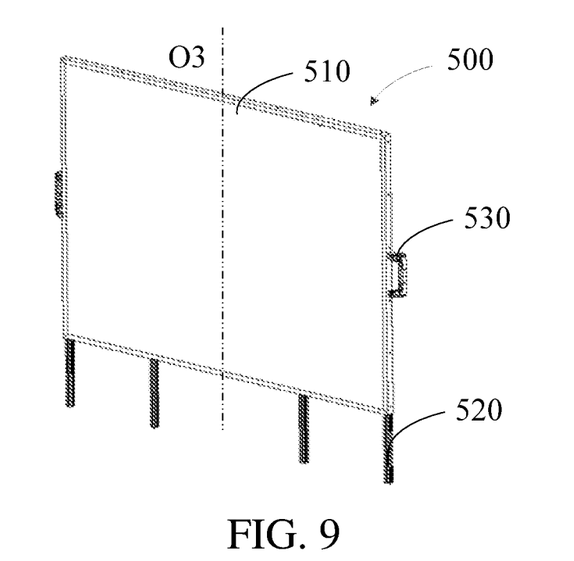
FIG. 9 is a perspective view of a pattern board of the calibration device shown in FIG.

Referring to FIG. 9, the pattern board 500 includes an attaching board 510, fixing feet 520 and handles 530. The attaching board 510 is a rectangular magnetic board, Four fixing feet 520 are mounted on one side of the attaching board 510. The fixing feet 520 are configured to be inserted into mounting holes of the beam assembly 20, to mount the pattern board 500 on the beam assembly 20. The handles 530 are mounted on other two opposite sides of the attaching board 510, making it convenient to mount the pattern board 500 on the beam assembly 20 or remove the pattern board 500 from the beam assembly 20. When the pattern board 500 is mounted on the pattern board 500, the central axis O3 of the pattern board 500, the central axis O2 of the guide rail 202 and the central axis O1 of the support body 110 are located in the same plane.

Figure 10:
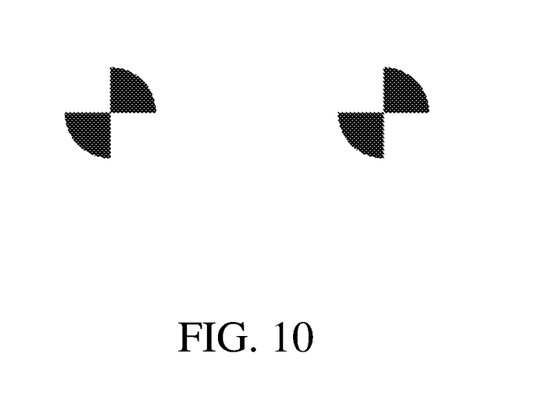
FIG. 10 to FIG. 12 are schematic diagrams of alignment patterns based on different requirements of various models of automobiles.
Figure 11:
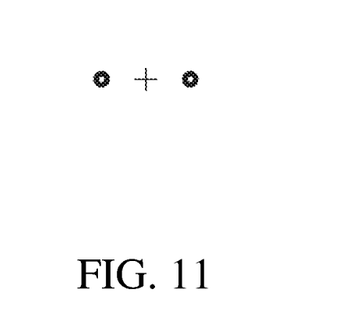
Figure 12:
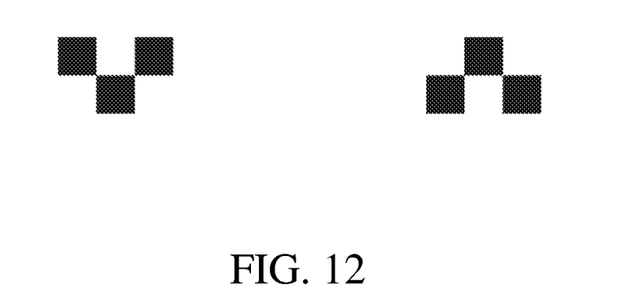

FIG. 10 to FIG. 12 show alignment patterns satisfying different requirements of various models of automobiles. These alignment patterns may be printed on a magnetic fabric surface whose size is the same as the size of the attaching board 510, to form magnetic fabrics having the alignment patterns, making it convenient to change alignment patterns for different models of automobiles and align an LKA system.

It can be understood that in some other embodiments, the attaching board 510 is not limited to a rectangular magnetic board. For example, the attaching board 510 may be a normal hoard. The alignment pattern may be printed on paper. The paper is bonded to the attaching board 510 or attached on the attaching board 510 in other appropriate manners.

Figure 13:
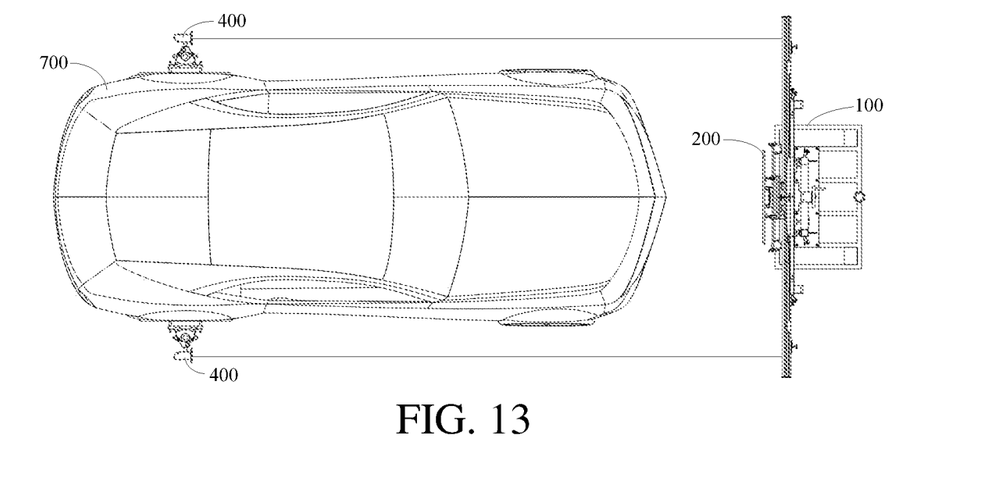
FIG. 13 is a schematic diagram of preliminarily calibrating the centerline of an automobile by using the calibration device shown in FIG. 1.

Referring to FIG. 13, in the first step, the support apparatus 100 is moved in front of an automobile 700 on the caster wheels 112, Based on a distance parameter required for an LKA system for the model of an automobile, the pattern board 500 is adjusted to a corresponding position of the front of the to-be-calibrated automobile 700. The reflector 200 is mounted on the sliding member 30, so that the guide rail 202 is parallel to the axle of the to-be-calibrated automobile 700. Wheel hub clamps are respectively mounted to the rear wheels of the to-be-calibrated automobile 700, Lasers 400 are respectively mounted and turned on and separately emit laser beams towards two ends of the guide rail 202. Angles of the lasers 400 are adjusted, so that laser points fall on the horizontal graduated scale 2020 on the two ends of the guide rail 202. Readings at the laser points on the two sides are recorded. If the readings are consistent, the central axis O2 of the guide rail 202 is located on the centerline of the to-be-calibrated automobile 700. If the readings are not consistent, the support apparatus 100 is moved transversely until the readings are consistent. At this time, the centerline is only preliminarily aligned. A particular angle difference exists between the guide rail 202 and the axle and cannot be completely eliminated by using the foregoing method. Therefore, the centerline of the to-be-calibrated automobile 700 needs to be further precisely calibrated.

Figure 14:
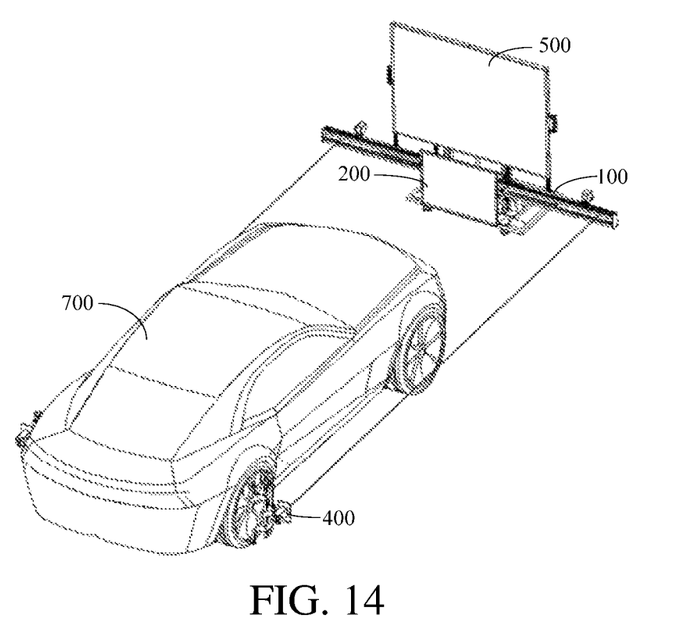
FIG. 14 and FIG. 15 are schematic diagrams of precisely calibrating the centerline of an automobile and calibrating an LKA system by the calibration device shown in FIG. 1.
Figure 15:
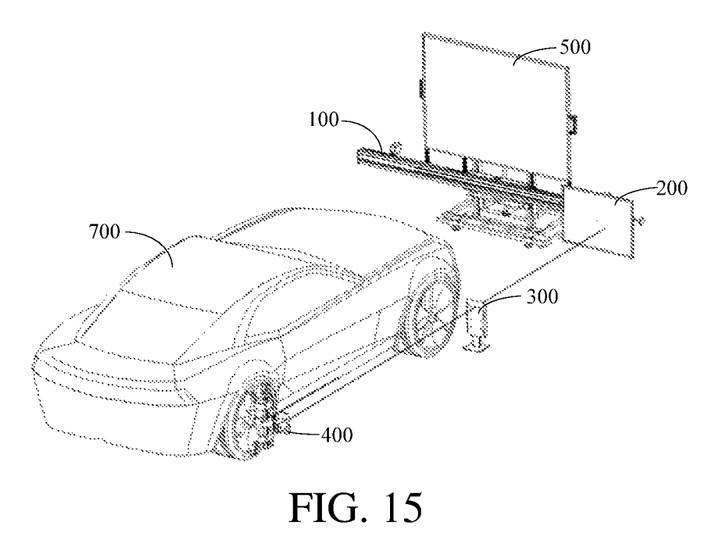

Referring to FIG. 14 and FIG. 15, in the second step, the reflector 200 is moved to an end of the guide rail 202, so that the laser on the side can be irradiated to the reflective surface of the reflector 200. The diaphragm 300 is chosen and placed at a middle position between the laser 400 and the reflector 200. The diaphragm portion 322 is placed to be perpendicular to the laser beam. The diaphragm slot 3222 is adjusted to have the same height as the emitting hole 4302 of the laser 400. An emergent angle of the laser 400 is adjusted and the position of the diaphragm 300 is appropriately moved, so that the laser beam can pass through the very center of the diaphragm slot 3222. The position of the reflector 200 is adjusted according to an actual case, so that the laser beam at this time can be irradiated to the reflector 200. The positions of the laser points that are reflected back are observed. The height adjustment members 114 are adjusted to enable the laser beam reflected by the reflector 200 to exactly return along the original path to be projected to the emitting hole 4302 of the laser 400.

After the foregoing steps are completed, the reflector 200 is moved to the center of the guide rail 202. It is examined again whether projection marks of the lasers 400 on two sides on the guide rail 202 are consistent. If the projection marks are consistent, it indicates that both the centerline and a vertical plane of the to-be-calibrated automobile 700 have been calibrated. If the projection marks are not consistent, the second step needs to be repeated.

After the centerline of the to-be-calibrated automobile 700 has been calibrated, the central axis O3 of the pattern board 500, the central axis O2 of the guide rail 202 and the central axis O1 of the support body 110 and the centerline of the body of the automobile 700 are located in the same plane. Based on the model of an automobile, a magnetic fabric having an alignment pattern corresponding to the model is magnetically attached to the attaching board 510. It is ensured that the alignment pattern is mounted correctly, with four corners being aligned. Next, calibration work for an LKA system is completed for the automobile according to the requirements of the model of the automobile.

It can be understood that in some other embodiments, the support apparatus 100 may be placed at the rear of the to-be-calibrated automobile 700. The two lasers 400 are mounted on two front wheels of the to-be-calibrated automobile 700. The centerline of the to-be-calibrated automobile 700 can also be calibrated from the rear of the to-be-calibrated automobile 700. Alternatively, the support apparatus 100 may be placed at the front or rear of the to-be-calibrated automobile 700. The two lasers 400 are mounted at two positions that are symmetrical about the centerline of the to-be-calibrated automobile 700. The centerline of the to-be-calibrated automobile 700 can also be calibrated from the front or the rear of the to-be-calibrated automobile 700.

Compared with the prior art, by means of the calibration device 600 in this embodiment of the present invention, the two lasers 400 are mounted on wheels on two sides of the to-be-calibrated automobile 700. Two laser beams that are emitted from equal distances with the wheels being reference points are irradiated to the horizontal graduated scale 2020 of the guide rail 202. Based or the marks on the horizontal graduated scale 2020, the guide rail 202 may be moved to an appropriate position, so that readings at positions irradiated by the lasers on two sides are consistent, thereby facilitating precise calibration of the centerline of the to-be-calibrated automobile 700.

In addition, on one side of the to-be-calibrated automobile 700, the reflector 200 is moved to an irradiation region of the laser 400 on the side, so that a laser point can be reflected back into an incident direction of the laser point. The diaphragm 300 is placed at a middle position between the laser 400 and the reflector 200. The diaphragm portion 322 is placed to be perpendicular to the laser beam. The height of the diaphragm slot 3222 is adjusted to be equal to the height of the laser 400. First, an emergent angle of the laser 400 is adjusted, so that an emergent laser beam can pass through the diaphragm slot 3222 to be irradiated to the reflector 200. The height adjustment members 114 are adjusted, so that the laser point reflected by the reflector 200 can return to an emergent point of the laser 400, thereby facilitating precise calibration of the centerline of the to-be-calibrated automobile 700.

If the centerline of the automobile has been calibrated, a corresponding alignment pattern may be selected or changed based on the model of the automobile and attached on the pattern board 500, thereby facilitating calibration operations for an LKA system for different models of automobiles.

Finally, it should be noted that the above embodiments are merely provided for describing the technical solutions of the present invention, but not intended to limit the present invention. In the concept of the present invention, in the foregoing embodiments or different embodiments, technical features may be combined, steps may be implemented in any, sequence, and many another variations in different aspects of the present invention may exist. For brevity, these are not provided in the details. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the scope of the present invention.

What is claimed is:

1. A calibration device for a lane keeping assist (LKA) system, comprising:
    a support apparatus, wherein the support apparatus comprises a horizontal graduated scale;
    a laser, wherein the laser is configured to be mounted on the body of an automobile and to emit a laser beam to the horizontal graduated scale; and
    a pattern board, wherein the pattern board is mounted on the support apparatus and is configured to attach an alignment pattern, wherein
    the pattern board is detachably mounted on the support apparatus and comprises an attaching board configured to attach the alignment pattern; and
    the attaching board is a rectangular magnetic board, configured to attach a magnetic fabric having the alignment pattern by a magnetic attraction force.

2. The calibration device according to claim 1, wherein the support apparatus comprises a guide rail, the horizontal graduated scale being disposed on the guide rail, and the horizontal graduated scale separately extending towards two sides of the guide rail with the center of the guide rail being the origin.

3. The calibration device according to claim 2, comprising a reflector and a diaphragm, wherein the support apparatus comprises a sliding member, the sliding member being movably mounted on the guide rail and being slidable along the guide rail, and the horizontal graduated scale being configured to facilitate positioning of the sliding member;
the reflector is mounted on the sliding member and is slidable together with the sliding member along the guide rail; and
the diaphragm is configured to control the laser beam to pass through the diaphragm, the reflector being configured to reflect the laser beam that passes through the diaphragm to the laser.

4. The calibration device according to claim 3, wherein the diaphragm is provided with a strip-shaped diaphragm slot, configured to control the laser beam to pass through the diaphragm.

5. The calibration device according to claim 4, wherein the diaphragm comprises a fixing base and a sliding diaphragm, the sliding diaphragm being provided with the diaphragm slot and being mounted on the fixing base, and positions of the sliding diaphragm and the fixing base being adjustable.

6. The calibration device according to claim 5, wherein the fixing base comprises a base, a fixing support and a locking handle;
    an end of the fixing support is mounted on the base, the fixing support having a strip shape, and the locking handle being mounted on the fixing support;
    the sliding diaphragm comprises a diaphragm portion and a sliding slot portion; and
    the diaphragm portion has a panel shape and is provided with the diaphragm slot, the sliding slot portion being mounted on the diaphragm portion, having a strip shape and being movably sleeved in the fixing support, the sliding slot portion being provided with a strip-shaped groove, and the locking handle passing through the groove and being configured to fasten the sliding diaphragm to the fixing base.

7. The calibration device according to claim 1, wherein the laser comprises an emitting portion, a mounting shaft and an observation target;
    the emitting portion is configured to emit the laser beam;
    the mounting shaft is mounted on the emitting portion and is configured to mount the laser on a wheel hub of the automobile; and
    the observation target is mounted on the emitting portion, the observation target comprising an observation target surface configured to display the position of the laser beam reflected back by the reflector, and an emitting hole being provided at a middle part of the observation target surface.

8. The calibration device according to claim 3, wherein the support apparatus comprises:
    a support assembly; and
    a beam assembly, wherein the beam assembly is mounted on the support assembly and is movable in a vertical direction relative to the support assembly, the beam assembly comprising the guide rail, the guide rail being horizontally disposed.

9. The calibration device according to claim 8, wherein the support assembly comprises a support body and height adjustment members, wherein
    at least three height adjustment members are mounted on a bottom surface of the support body, the at least three height adjustment members being configured to adjust an overall horizontal angle of the support body and a pitch angle of the support body.

10. The calibration device according to claim 9, wherein there are three height adjustment members, the three height adjustment members being distributed in an isosceles triangle and being configured to adjust the overall horizontal angle of the support body in cooperation, and a height adjustment member located at the vertex position of the vertex angle of the isosceles triangle being configured to adjust the pitch angle of the support body.

11. The calibration device according to claim 9, wherein the support assembly comprises a base support and an upright support, an end of the upright support being connected to the base support, and the base support supporting the upright support;
the beam assembly is mounted on the upright support;
the base support comprises caster wheels, the support body and the height adjustment members; and
at least three caster wheels are mounted on the bottom surface of the support body and are configured to facilitate the movement of the base support.

12. The calibration device according to claim 11, wherein the upright support comprises a lifting screw rod;
the lifting screw rod is disposed in a vertical direction; and
the beam assembly is sleeved on the lifting screw rod and fits threads of the lifting screw rod, when rotating around the central axis of the lifting screw rod, the lifting screw rod being capable of driving the beam assembly to move along the lifting screw rod in a vertical direction.

13. The calibration device according to claim 12, wherein the upright support comprises a lifting guide rail;
the lifting guide rail comprises a vertical bar, the vertical bar being disposed in a vertical direction; and
the beam assembly is movably mounted on the vertical bar, the vertical bar being configured to guide the beam assembly to move in a vertical direction.

14. The calibration device according to claim 13, wherein the lifting guide rail comprises a cross bar, the cross bar being mounted on the vertical bar in a horizontal direction; and
one end of the lifting screw rod is mounted on the cross bar and the other end of the lifting screw rod is mounted on the support body.

15. The calibration device according to claim 13, wherein the lifting guide rail comprises a cross bar and a bottom bar;
two vertical bars are disposed at an interval in a vertical direction in parallel;
the cross bar is disposed in a horizontal direction, two ends of which being respectively mounted on the two vertical bars;
the bottom bar is fixedly mounted on the support body, an end, away from the cross bar, of each vertical bar being fixedly mounted on the bottom bar; and
one end of the lifting screw rod is fixedly mounted on the cross bar and the other end of the lifting screw rod is fixedly mounted on the bottom bar.

16. The calibration device according to claim 13, wherein the upright support comprises a height gauge, the height gauge being mounted on the vertical bar in a vertical direction and being configured to measure a movement distance of the beam assembly in a vertical direction.

17. The calibration device according to claim 12, wherein the beam assembly comprises a supporting member and the guide rail;
the supporting member comprises a supporting body and a movable block;
the movable block is fixedly mounted on the supporting body and is sleeved on the lifting screw rod, the movable block fitting the threads of the lining screw rod;
the guide rail is fixedly mounted on the supporting body in a horizontal direction; and
the sliding member is movably mounted on the guide rail, the sliding member being movable along the guide rail in a horizontal direction.

18. The calibration device according to claim 17, wherein the upright support comprises a vertical bar, the vertical bar being disposed in a vertical direction; and
the supporting member comprises a slider, the slider being fixedly mounted on the supporting body, being movably mounted on the vertical bar and being slidable along the vertical bar.

19. The calibration device according to claim 17, wherein two opposite sides of the supporting body extend to form two clamping portions respectively, the two clamping portions having a long strip shape and being disposed at an interval in parallel to each other in a horizontal direction;
two guide rails are respectively mounted on the two clamping portions and are disposed at an interval of a preset distance in parallel in a horizontal direction; and
the sliding member is movably mounted on the guide rails by using a sliding bearing.

20. The calibration device according to claim 17, wherein the beam assembly comprises a horizontal bead, the horizontal bead being configured to detect whether the guide rail is disposed in a horizontal direction.

* * * * *